US 6,590,692 B1

(12) United States Patent
Simon

(10) Patent No.: US 6,590,692 B1
(45) Date of Patent: Jul. 8, 2003

(54) PRODUCING MODULATED LIGHT USING ELECTRON EMITTERS

(75) Inventor: Jonathan Simon, Castro Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/104,099

(22) Filed: Mar. 22, 2002

(51) Int. Cl.$^7$ ................................................ G02F 1/03
(52) U.S. Cl. ........................ 359/246; 359/260; 359/290; 359/291
(58) Field of Search .......................... 359/245, 246, 359/585–587, 260, 290, 291; 372/20, 26, 32, 36, 18

(56) References Cited

U.S. PATENT DOCUMENTS 6,292,598 B1 * 9/2001 Price et al. ................. 359/245
6,414,781 B1 * 7/2002 Saitoh ........................ 359/246
6,437,899 B1 * 8/2002 Noda ......................... 359/245

OTHER PUBLICATIONS

"Producing Modulated Light Using Integrated Packages," Ser. No.: 10,103,925, filed Mar. 22, 2002.

* cited by examiner

Primary Examiner—Hung Xuan Dang
Assistant Examiner—M. Hasan

(57) ABSTRACT

Optical systems for producing modulated light are provided. A representative optical system incorporates an electron emitter and a electrical-to-optical converter. The electron emitter is operative to produce electrons. The electrical-to-optical converter is operative to receive electrons and convert the electrons into light. The optical system modulates the light so that modulated light is emitted. Methods and other optical systems also are provided.

25 Claims, 6 Drawing Sheets

PRODUCING MODULATED LIGHT USING ELECTRON EMITTERS

FIELD OF THE INVENTION

The present invention generally relates to optics. More specifically, the invention relates to systems and methods that involve the use of electron emitters for producing modulated light.

DESCRIPTION OF THE RELATED ART

Optical systems, such as optical communication systems, are configured to propagate signals between various locations. Through at least a portion of such a communication system, the signals are provided as light beams that are propagated along an optical path. Such an optical path usually is defined by one or more communication links, each of which typically includes an optical fiber.

Modulated light sources typically are used to generate light beams for propagating through optical communication links. More specifically, a modulated laser typically is associated with each communication link for generating the light beams. By way of example, Vertical Cavity Surface-Emitting Lasers (VCSELs) have been used to generate modulated light beams.

A VCSEL typically includes a narrow aperture that characteristically provides a narrow beam of light at a short distance. The beam of light produced by a VCSEL also tends to diverge rapidly with increasing distance from the aperture. Therefore, it typically is necessary to ensure that an optical component that is intended to receive the beam of light from a VCSEL is placed close to the aperture of the VCSEL. Clearly, this requires a relatively high degree of precision to ensure that the optical component is aligned with the optical axis of the VCSEL because the optical component typically is receiving the narrow portion of the beam of light. As is known, ensuring proper placement of an optical component relative to a VCSEL can be time-consuming and/or expensive.

Use of VCSELs also can be problematic in some applications. In particular, VCSELs may not be suitable for use in applications in which a high degree of wavelength stability is required. This is because the wavelength of the light produced by a VCSEL tends to drift with temperature. Therefore, it should be appreciated that there is a need for improved systems and methods that address these and/or other perceived shortcomings of the prior art.

SUMMARY OF THE INVENTION

Optical systems of the invention include electron emitters for producing electrons. Electrical-to-optical converters of the optical systems receive the electrons and convert the electrons into light. The optical systems also modulate the light so that modulated light is emitted.

The electrical-to-optical converters include phosphorescent materials for generating light. The light generated by the phosphorescent materials is relatively omnidirectional and, therefore, precision alignment techniques may not be required when optical components are to be aligned for receiving the light. Additionally, the wavelength of the light generated by the phosphorescent material does not tend to vary with temperature. More specifically, phosphorescent material relies on atomic transitions to produce light and, therefore, is inherently relatively wavelength stable with respect to temperature.

In some embodiments, external modulation is used to modulate the light produced by the phosphorescent materials. By using external modulation, high speed modulation (high bandwidth) can be achieved. For example, in some embodiments, an electro-optic modulator, such as a thin film electro-optic element formed of $LiNbO_3$, can be used to modulate the light externally.

Some embodiments of the optical systems also can be configured as integrated packages. By providing an integrated package for producing modulated light, difficulties associated with operatively aligning optical components at the location where the modulated light is required can be avoided. In particular, since the constituent components of the integrated package are operatively aligned with each other in a manufacturing environment, more precise alignment of the components can be achieved.

By using integrated packages, improved efficiencies in manufacturing also may be achieved. More specifically, the integrated packages may be well suited for manufacture by batch-processing techniques. For instance, in some embodiments, the electron emitter is supported by a first substrate, e.g., a substrate formed of a material suited for semiconductor fabrication, and the electrical-to-optical converter and external modulator are supported by a second substrate. The first and second substrates then can be fixed in position relative to each other, such as by a bonding operation.

In some embodiments, the electron emitter and electrical-to-optical converter can be arranged within a cavity formed by the integrated package. Advantageously, the integrated package provides a protective enclosure for the components arranged within the cavity, thereby improving system robustness. Additionally, the cavity can be hermetically sealed to reduce the potential for degradation of device performance due to contamination, for example. The cavity also can be evacuated in some embodiments to facilitate proper operation of the electron emitter.

A representative method of the invention for producing modulated light includes: producing a beam of electrons; converting the beam of electrons into light; and modulating the light.

Clearly, some embodiments of the invention may not exhibit one or more of the advantages and/or properties set forth above. Additionally, other systems, methods, features and/or advantages of the present invention will be or may become apparent to one with skill in the art upon examination of the following drawings and detailed description. It is intended that all such additional systems, methods, features, and/or advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As will be described in greater detail herein, the present invention involves the use of electron emitters for stimulating phosphorescent materials to generate light. The light produced by the phosphorescent materials is modulated and, thus, may be suitable for various uses, such as in optical communication systems.

Figure 1:
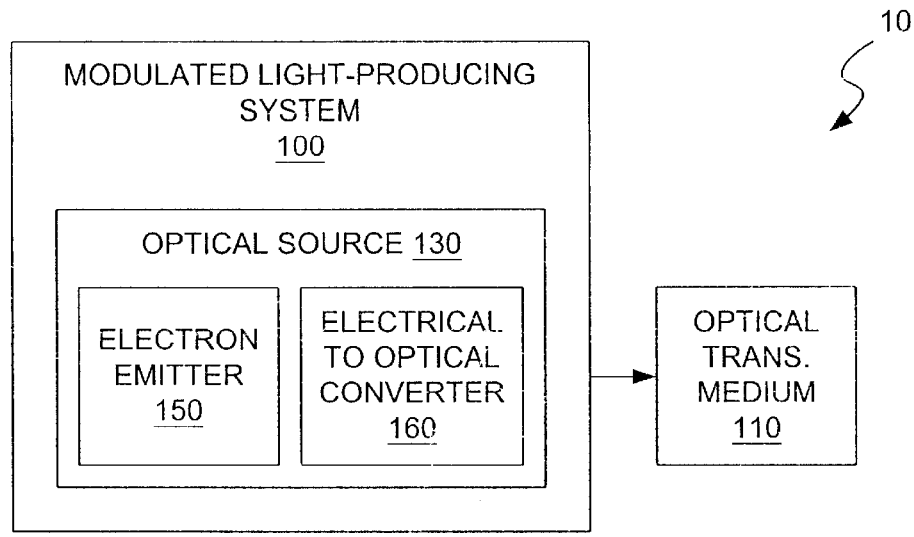
FIG. 1 is a schematic diagram of an embodiment of an optical system of the present invention.

Referring now to the figures, wherein like reference numerals indicate corresponding components throughout the several views, FIG. 1 schematically depicts an embodiment of an optical system 10 of the present invention. As shown in FIG. 1, optical system 10 includes a modulated light-producing system 100 that optically communicates with an optical transmission medium 110. Modulated light-producing system 100 generates modulated light that can be provided to and then propagated by optical transmission medium 110, which can be an optical fiber or free space, for example. As used here, the term "modulate" refers to altering at least one characteristic, such as intensity (amplitude), polarization, and frequency, of light.

Modulated light-producing system 100 of FIG. 1 incorporates at least one optical source 130 for producing light. More specifically, optical source 130 includes an electron emitter 150 and a electrical-to-optical converter 160. The electron emitter, e.g., a sharpened tip emitter, solid-state emitter, cold-cathode emitter, etc., produces electrons, e.g., a beam of electrons, that are directed toward the electrical-to-optical converter. The electrical-to-optical converter receives the beam of electrons and converts the beam of electrons into light. In this regard, the electrical-to-optical converter includes phosphorescent material that generates light in response to the electrons.

Figure 2:
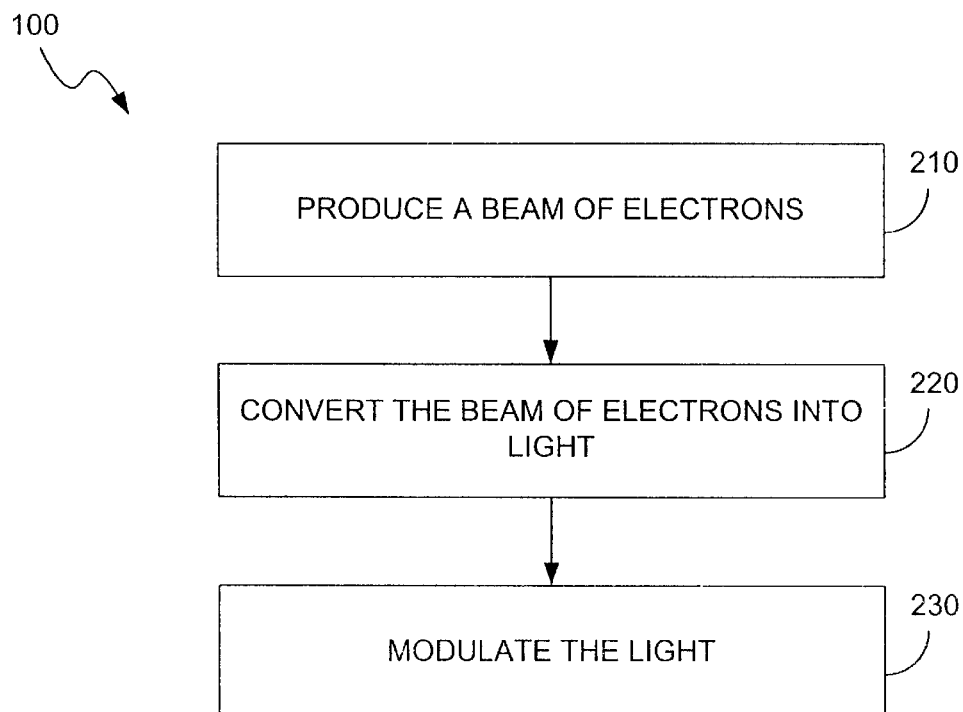
FIG. 2 is a flowchart depicting functionality that can be associated with the modulated light-producing system of FIG. 1.

Functionality of the embodiment of the modulated light-producing system 100 of FIG. 1 is depicted in the flowchart of FIG. 2. In FIG. 2, a beam of electrons is produced (block 210). In block 220, the beam of electrons is converted to light. In block 230, the light is modulated.

Figure 3:
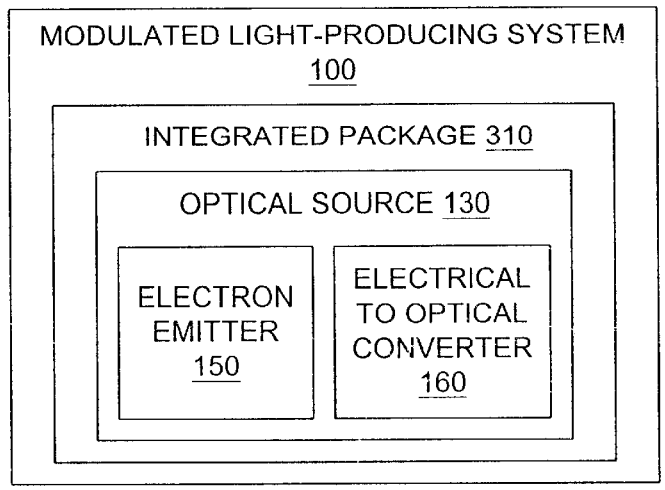
FIG. 3 is a schematic diagram of an embodiment of a modulated light-producing system of the invention that includes an integrated package.

Reference is now made to the schematic diagram of FIG. 3, which depicts an embodiment of a modulated light-producing system 100 that includes an integrated package. As used herein, the term "integrated package" refers to a device configuration that can be formed by a batch-processing technique and/or that provides a degree of robustness and/or resistance to external environments that is not exhibited individually by the constituent components of the device.

The embodiment of the modulated light-producing system 100 of FIG. 3 incorporates an integrated package 310. The integrated package includes at least one optical source 130 for producing light. More specifically, each optical source 130 includes at least one electron emitter 150 and an associated electrical-to-optical converter 160.

By using integrated packages, improved efficiencies in manufacturing may be achieved. More specifically, the integrated packages may be well suited for manufacture by batch-processing techniques. Additionally, in those embodiments that include first and second substrates that are separately formed, different manufacturing techniques can be used to form each of the substrates as well as the components supported by the substrates. Furthermore, alignment of the substrates and the various components of the integrated package can be conducted in a manufacturing environment. Therefore, more precise alignment of the components can be achieved. This is in contrast to other assemblies that are used for producing modulated light that require operatively aligning optical components at the location where the modulated light is required.

Figure 4:
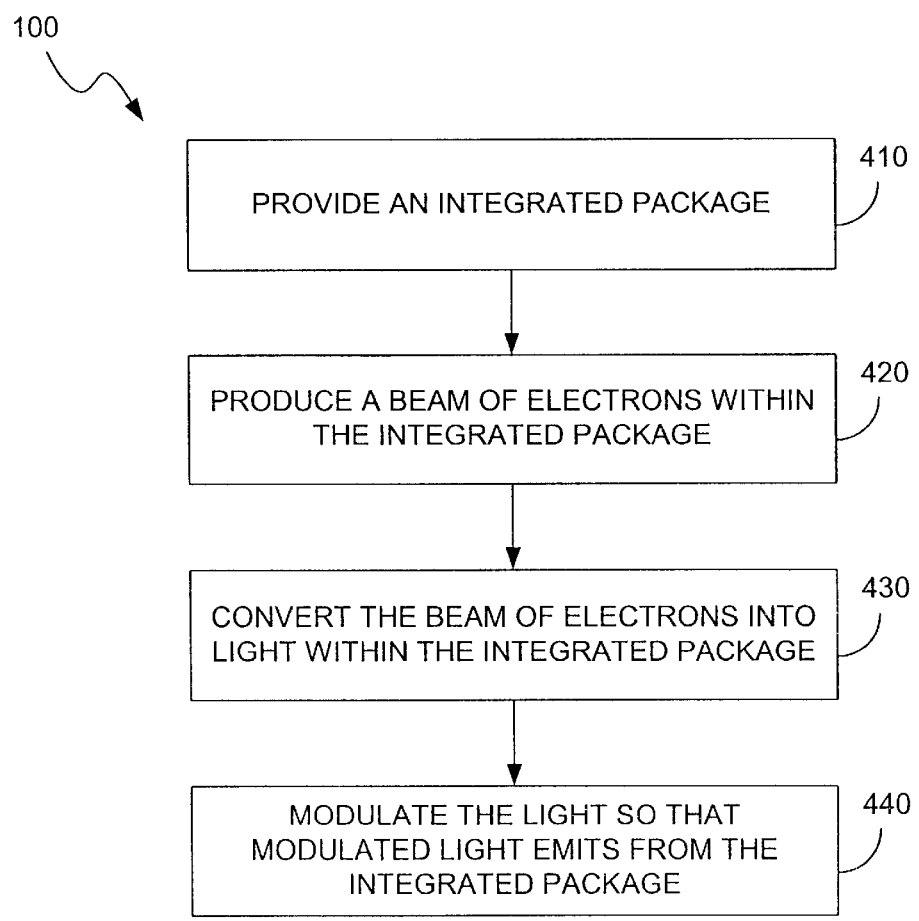
FIG. 4 is a flowchart depicting functionality that can be associated with the modulated light-producing system of FIG. 3.

Functionality of the embodiment of the modulated light-producing system 100 of FIG. 3 is depicted in FIG. 4. As shown in FIG. 4, an integrated package is provided in block 410. In block 420, a beam of electrons is produced and (in block 430) converted into light within the integrated package. In block 440, the light is modulated so that modulated light is emitted from the integrated package.

Figure 5:
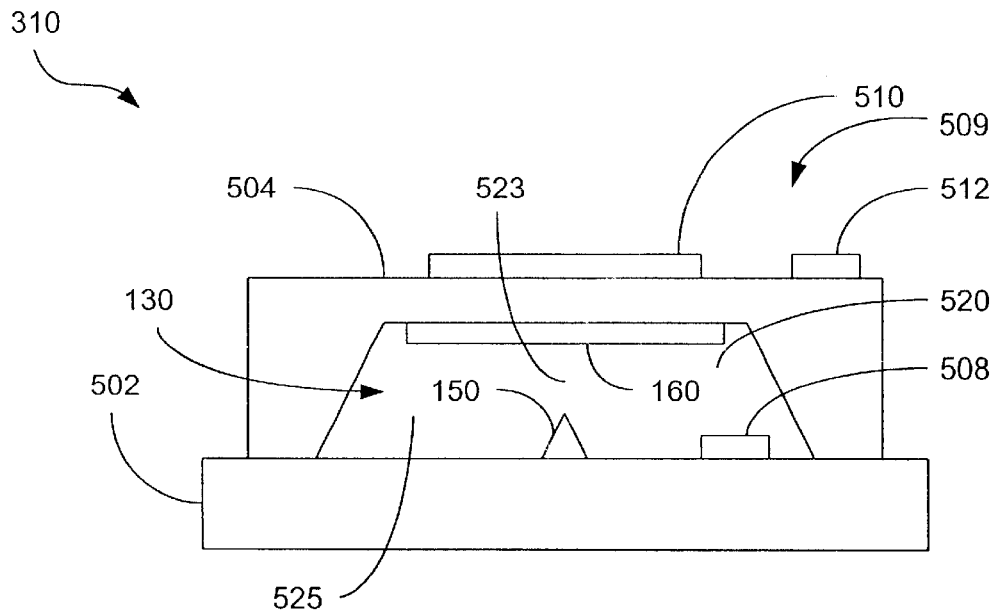
FIG. 5 is another embodiment of a modulated light-producing system that includes an integrated package.

An embodiment of an integrated package 310 is depicted in greater detail in FIG. 5. In FIG. 5, integrated package 310 includes a first substrate 502 and a second substrate 504. The first and second substrates are fixed in position with respect to each other, such as by bonding the substrates together, to form the integrated package.

Substrate 502 supports an electron emitter 150 and associated driving circuitry 508 of an optical source 130. The driving circuitry 508 receives power and/or control signals for the electron emitter 150, at least some of which may originate outside the integrated package. Substrate 502 can be formed of material(s), e.g., silicon, that is suitable for use in a semiconductor fabrication process. In this manner, electron emitter 150 and driving circuitry 508 can be formed in and/or on substrate 502, for example. Note, in some embodiments, other materials can be used to form the substrate provided that adequate mechanical support is provided for mounting the electron emitter.

Substrate 504 supports the electrical-to-optical converter 160 of the optical source 130. The electrical-to-optical converter is arranged to receive the beam of electrons emitted from the electron emitter. The electrical-to-optical converter converts the beam of electrons into light energy. In converting the beam of electrons into light, the electrical-to-optical converter uses one or more phosphorescent materials. Various phosphorescent materials can be used to form an electrical-to-optical converter. For example, oxides of silicon and gallium can be used. These oxides can be doped with heavy metals, e.g., zinc, cadmium, etc., or rare earth, e.g., cerium, erbium and yttrium, among others. Clearly, such a material would be selected based upon the requirements of a particular application, such as the color (wavelength) of the light, as would be recognized by one of skill in the art.

Substrate 504 also supports an electro-optic modulator 509 that externally modulates light emitted from the electrical-to-optical converter. The electro-optic modulator 509 includes an electro-optic element 510 and associated driving circuitry 512. Driving circuitry 512 receives power, information, and/or control signals for the electro-optic element, at least some of which may originate outside the integrated package. Note, arranging the driving circuitry 512 in close proximity to, e.g., on or in the same substrate as, electro-optic element 510 potentially enables higher rates of modulation of light received by the electro-optic element. This is because the reduced signal transmission path length between the driving circuitry and the electro-optic element enables the use of high-capacity transmission media for providing control inputs from the driving circuitry to the electro-optic element.

Clearly, the electro-optic element 510 is arranged to communicate optically with the electrical-to-optical converter. In the embodiment of FIG. 5, which includes substrate 504 being arranged between substrate 502 and the electro-optic element, substrate 504 permits light emitted from the electrical-to-optical converter to be directed to the electro-optic element. By way of example, substrate 504 could include an aperture (not shown) that is aligned between the electrical-to-optical converter and the electro-optic element. In other embodiments, at least a portion of substrate 504, i.e., at least the portion of substrate 504 arranged between the electrical-to-optical converter and the electro-optic element, can be formed of a material that is optically transparent at the wavelength of the light transmitted by the optical source.

The electro-optic element 510 can be provided in various forms and can be formed of various materials and/or combinations of materials. For instance, the electro-optic element can be a thin film element that is compatible with semiconductor fabrication. In such an embodiment, the electro-optic element can be formed with the substrate that supports it. In some embodiments, the electro-optic element can be formed of $LiNO_3$, quartz, etc. Clearly, the material(s) can be selected based upon the requirements of the particular application.

By way of example, when the electro-optic element 510 is formed of $LiNO_3$, the driving circuitry 512 of the electro-optic modulator enables an electric field to be generated in the electro-optic element. The electric field alters at least one characteristic, e.g., the index of refraction, of at least a portion of the electro-optic element through which the light propagates. It is this change of the electro-optic element that enables modulation of the light. In this case, the light is modulated with respect to amplitude (intensity).

By way of further example, some electro-optic elements can change the length of the optical path through which light propagates to produce frequency modulation. In some embodiments, the electro-optic element generates acoustic energy that is used to lengthen and/or shorten the optical path, e.g., the dimension of the electro-optic element through which the light propagates. Clearly, modulation of the light with respect to other optical characteristics can be accomplished by using other kinds of electro-optical modulators.

Typically, the optical source 130 is operative to be a constant source, i.e., the electron emitter and electrical-to-optical converter constantly produce light when in operation. In such embodiments, the optical source is only externally modulated. Additionally or alternatively, the optical source can be directly modulated in some embodiments. That is, the optical source can be operative to produce light intermittently.

As shown in FIG. 5, electron emitter 150 is arranged within a cavity 520 that is formed between substrates 502 and 504. Based upon the power and/or performance characteristics of the electron emitter, it may be necessary to evacuate the cavity 520 so the beam of electrons emitted within the cavity can be properly directed to the electrical-to-optical converter.

Note, in FIG. 5, a gap 523 exists between the electron emitter and the electrical-to-optical converter, i.e., the electron emitter does not contact the electrical-to-optical converter. This gap can be sized and shaped to accommodate a manufacturing tolerance associated with forming the integrated package. In particular, the manufacturing tolerance can be selected so that, during formation of the integrated package, the various components of the integrated package do not engage and/or damage each other. In some embodiments, however, one or more components supported by one substrate may engage one or more components of the other substrate and, thus, a gap is not required.

In FIG. 5, gap 523 is defined, at least in part, by a recess 525 formed in substrate 504. By way of example, substrate 504 could be etched to form the recess.

Figure 6:
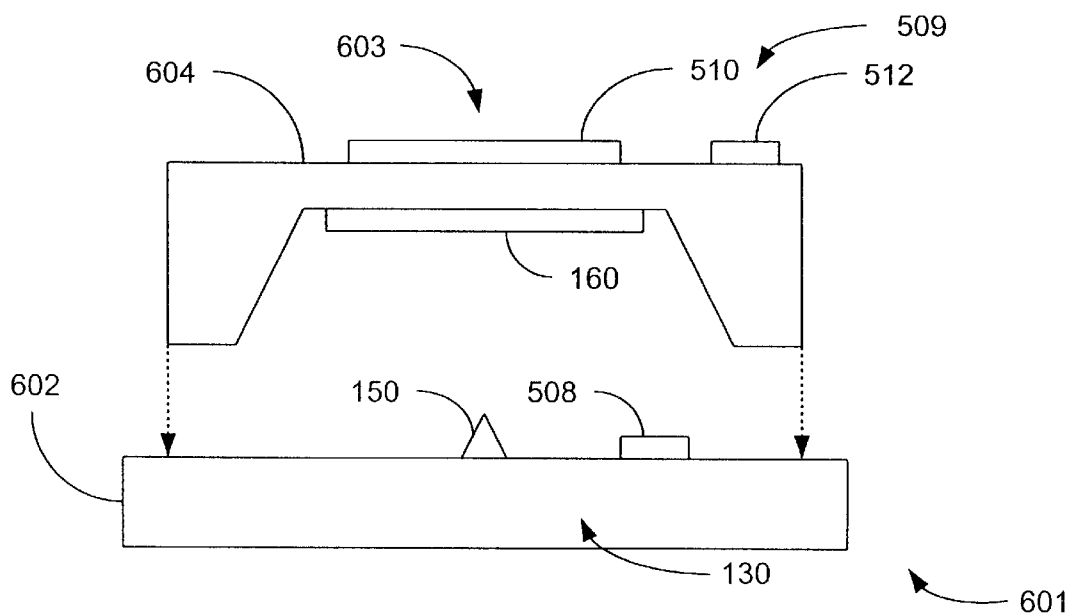
FIG. 6 is a flowchart depicting functionality that can be associated with the modulated light-producing system of FIG. 5.

Integrated packages of the invention can be constructed by various fabrication techniques. For instance, as shown in FIG. 6, an embodiment of an integrated package is formed of multiple sections. In particular, a first section 601 of the integrated package includes substrate 602 and the electron emitter 150 of an associated optical source 130. A second section 603 includes substrate 604 and its associated electro-optic modulator 509 as well as the electrical-to-optical converter 160 of the optical source. The sections are attached to each other, such as by bonding.

Figure 7:
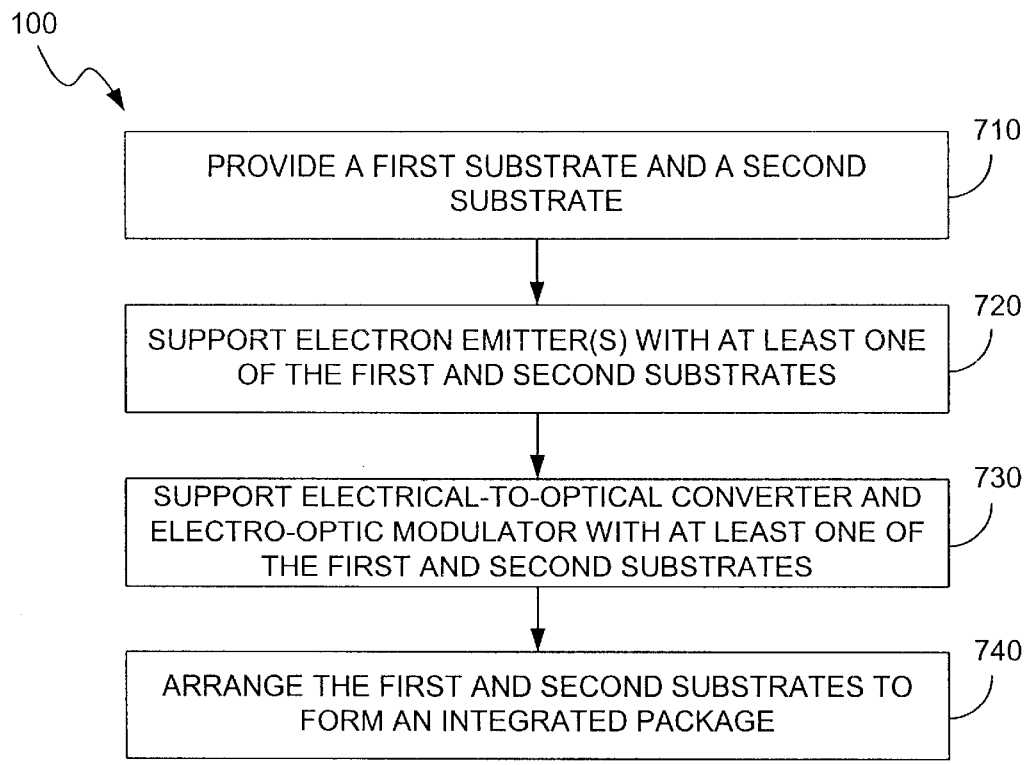
FIG. 7 is another embodiment of a modulated light-producing system that includes an integrated package.

A representative method for forming an integrated package of the invention is depicted in the flowchart of FIG. 7. In FIG. 7, a first substrate and a second substrate are provided (block 710). In block 720, an electron emitter and associated driving circuitry are supported by at least one of the first and second substrates. Proceeding to block 730, an electrical-to-optical converter and an electro-optic modulator are supported by at least one of the first and second substrates. Thereafter, such as depicted in block 740, the first substrate and second substrate are arranged to form an integrated package. In some embodiments, this can include directly and fixedly attaching the substrates to each other. Attachment of the substrates also can form an hermetically-sealed environment within the integrated package in some embodiments.

Figure 8:
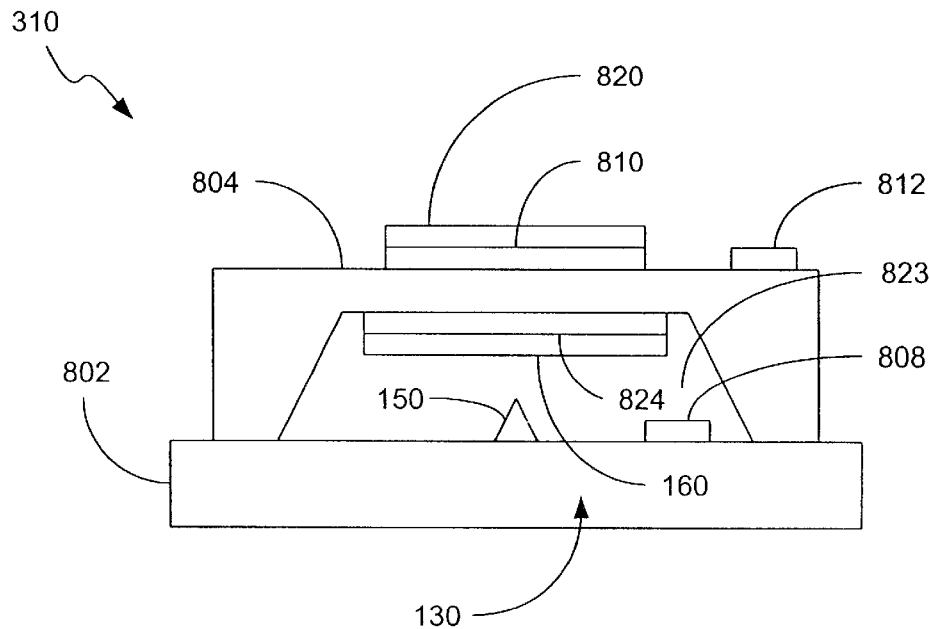
FIG. 8 is still another embodiment of a modulated light-producing system that includes an integrated package.

Another representative embodiment of an integrated package that can be used in a modulated light-producing system is depicted in FIG. 8. In FIG. 8, integrated package 310 includes a first substrate 802, which supports electron emitter 150 and associated driving circuitry 808, and a second substrate 804, which includes a electrical-to-optical converter 160, an electro-optic element 810 and associated driving circuitry 812. Integrated package 310 also includes at least one diffractive element 820 that optically communicates with the electro-optic element. In FIG. 8, the diffractive element is arranged so that the electro-optic element is at least partially disposed between the electrical-to-optical converter and the diffractive element.

In the embodiment of FIG. 8, diffractive element 820 is formed directly onto the electro-optic element; however, various other configurations can be used. Regardless of the particular configuration used, the diffractive element may be constructed to direct and/or focus the modulated light propagated from the electro-optic element. For example, the diffractive element can be used to direct and/or focus the modulated light so that it can be propagated to an optical transmission medium, e.g., medium 110 of FIG. 1.

Additionally, integrated package 310 of FIG. 8 includes at least one optical filter 824 that optically communicates with the electrical-to-optical converter. Such an optical filter allows one or more selected frequencies of the light generated by the electrical-to-optical converter to be emitted from the integrated package. Note, one or more of the diffractive element and the optical filter can be arranged within cavity 823.

Additionally note that in the embodiment of FIG. 8, the substrates 802 and 804 form a enclosure that encases at least the optical source. By forming such an enclosure, a robust modulated light source can be produced. More specifically, the enclosure can protect one or more of the components from damage, such as may occur during, component handling. Furthermore, when the integrated package forms a hermetic seal about at least some of the components, the potential for degradation of device performance due to contamination of those components, for example, can be reduced. The hermetic seal also enables the cavity to be evacuated.

Figure 9:
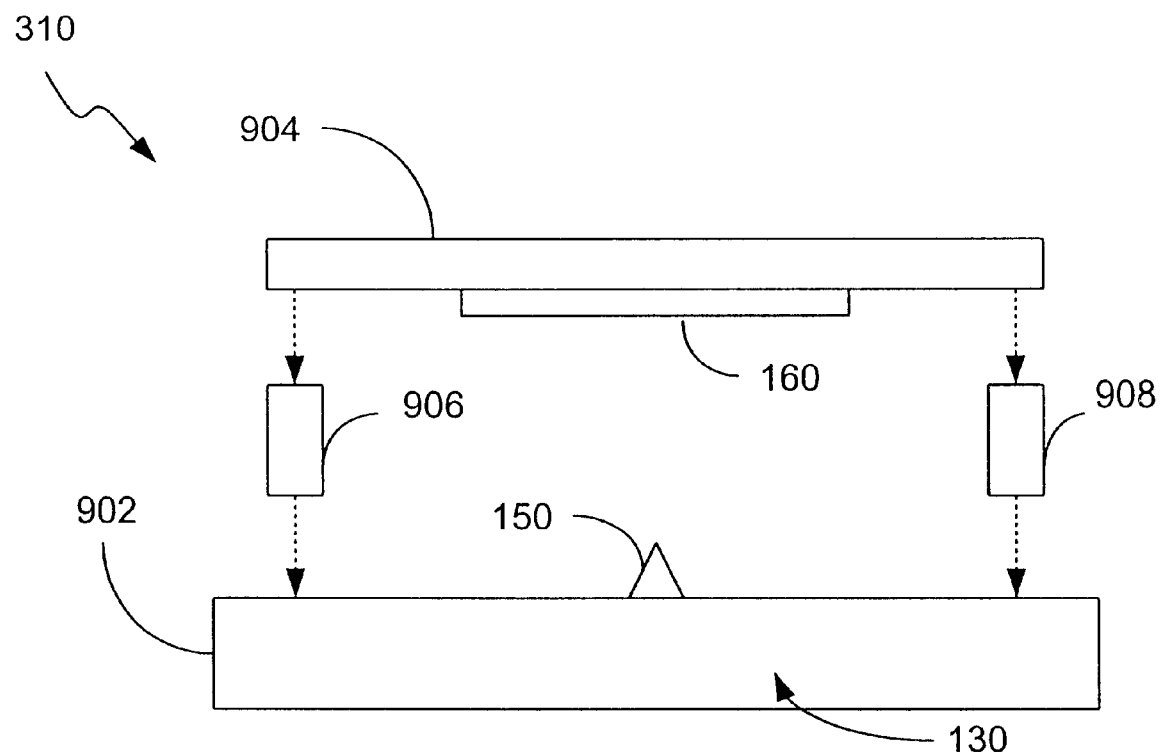
FIG. 9 is yet another embodiment of a modulated light-producing system that includes an integrated package.

As shown in FIG. 9, other techniques can be used for fabricating an integrated package other than that depicted schematically in FIG. 5. In particular, the exemplary technique depicted in FIG. 9 includes providing two substrates (902, 904) that are substantially planar. The various components can be supported by, e.g., formed on and/or in, the substrates and then the substrates can be arranged in a substantially fixed spacial relationship relative to each other. In the embodiment depicted in FIG. 9, this is accomplished by arranging mounting components (906, 908) between the substrates. In this manner, a cavity is formed between the substrates by the mounting components maintaining the substrates in a spaced relationship from each other.

Arrays capable of producing multiple modulated light beams also can be formed. In this regard, an embodiment of an integrated package that incorporates an array of optical sources is depicted in FIG. 10.

Figure 10:
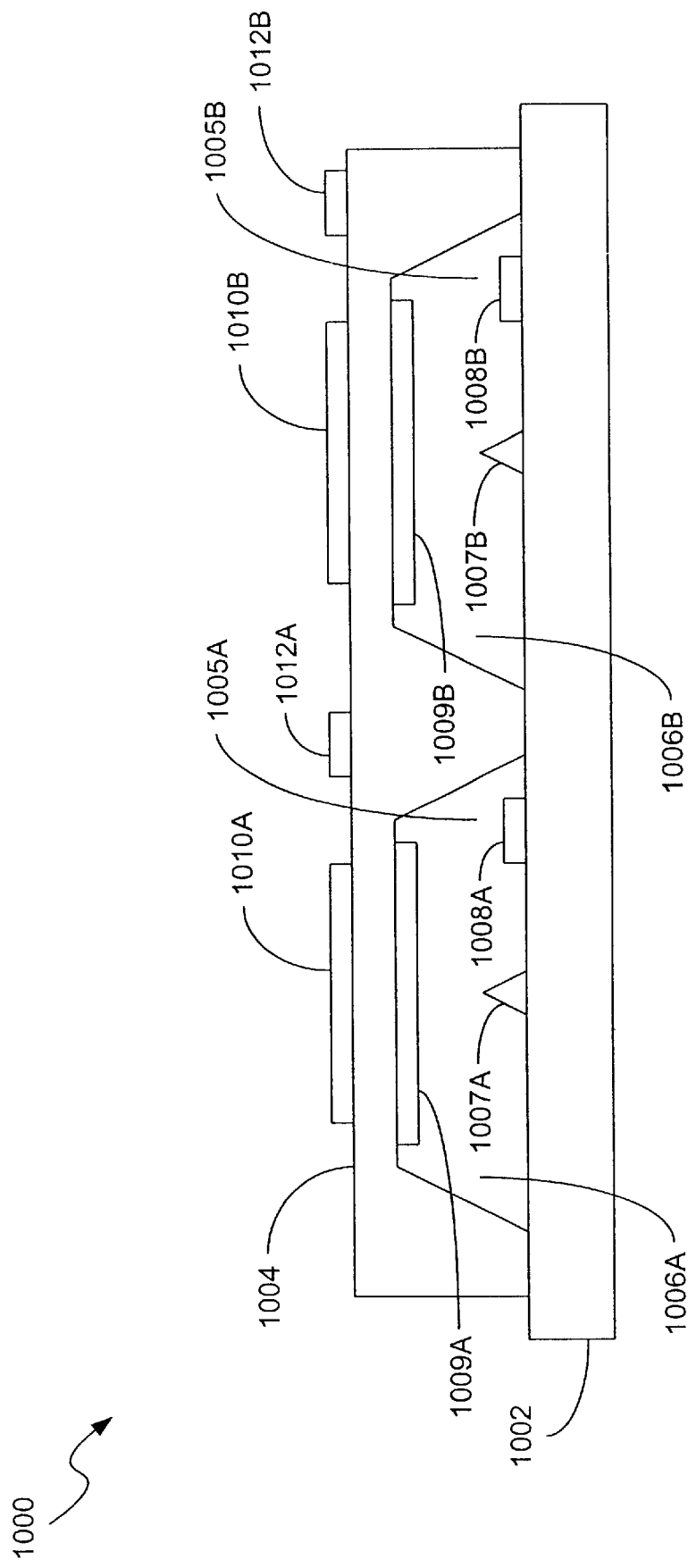
FIG. 10 is an embodiment of a modulated light-producing system that incorporates an array of optical sources.

Integrated package 1000 of FIG. 10 includes a lower substrate 1002 and an upper substrate 1004. Substrate 1002 engages upper substrate 1004 to define multiple cavities (1005A, 1005B). In particular, the upper subtrate includes recesses (1006A, 1006B), each of which defines a cavity.

Substrate 1002 supports multiple electron emitters (1007A, 1007B) and associated driving circuitry (1008A, 1008B). Substrate 1004 supports electrical-to-optical converters (1009A, 1009B), electro-optic elements (1010A, 1010B) and associated driving circuitry (1012A, 1012B). More specifically, an electron emitter and its associated driving circuitry, and an electrical-to-optical converter are arranged within each cavity.

By arranging only one optical source in each cavity, crosstalk between adjacent optical sources can be avoided. However, in those embodiments in which crosstalk is not problematic, multiple optical sources could be arranged within a single cavity.

Additionally, in other embodiments, multiple upper substrates could be used to define cavities for housing the optical sources. For example, each upper substrate could define one recess that defines a cavity for receiving an optical source.

Each optical source of an integrated package need not exhibit the same optical properties, e.g., wavelength, as another. Therefore the array of optical sources of such an integrated package may be used in a Wavelength Division Multiplexing (WDM) application. In such an application, multiple individual light signals are modulated with respect to a carrier wavelength, propagated along the same optical transmission medium, and then deconvolved at a receiving end.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated.

By way of example, it should also be noted that the functions noted in various blocks of FIG. 7, or any other of the flowcharts may occur out of the order in which they are depicted. For example, two blocks shown in succession in FIG. 7 may, in fact, be executed substantially concurrently. In other embodiments, the blocks may sometimes be executed in the reverse order depending upon the functionality involved. Additionally, in some embodiments, an integrated package configuration may not be used. All such modifications and variations, are within the scope of the invention as determined by the appended claims when interpreted in accordance with the breadth to which they are fairly and legally entitled.

What is claimed is:

1. An optical system comprising:
   an electron emitter operative to produce electrons; and
   an electrical-to-optical converter arranged to receive the electrons from said electron emitter, said electrical-to-optical converter being operative to convert the electrons into light,
   said optical system being operative to modulate the light such that modulated light is emitted therefrom.

2. The optical system of claim 1, wherein said electrical-to-optical converter includes at least one phosphorescent material to convert the electrons into the light.

3. The optical system of claim 1, further comprising:
   an electro-optic modulator arranged to receive the light from said electrical-to-optical converter, said electro-optic modulator being operative to modulate the light to produce the modulated light.

4. The optical system of claim 3, wherein said electro-optic modulator is operative to emit a modulated light beam.

5. The optical system of claim 3, further comprising:
   a diffractive element optically communicating with said electro-optic modulator, said diffractive element being operative to receive the modulated light from said electro-optic modulator and direct the modulated light.

6. The optical system of claim 5, wherein said diffractive element is operative to focus the modulated light to form a modulated light beam.

7. The optical system of claim 3, wherein said electro-optic modulator includes an electro-optic element and driving circuitry, and said electro-optic element is a thin film electro-optic element.

8. The optical system of claim 3, wherein said electro-optic modulator amplitude modulates the light.

9. The optical system of claim 3, wherein said electro-optic modulator frequency modulates the light.

10. The optical system of claim 1, further comprising:
    an optical filter arranged to receive the light from said electrical-to-optical converter and allow propagation of at least a selected frequency of the light.

11. The optical system of claim 1, further comprising:
    means for allowing propagation of at least selected frequency of the light.

12. The optical system of claim 1, further comprising:
an integrated package, said electron emitter and said electrical-to-optical converter being supported by said integrated package.

13. The optical system of claim 12, wherein said integrated package includes a first substrate and a second substrate;
wherein said electron emitter is supported by said first substrate; and
wherein said electrical-to-optical converter is supported by said second substrate.

14. The optical system of claim 12, wherein said first substrate and said second substrate are arranged in a fixed spatial relationship relative to each other and define a cavity therebetween, at least said electron emitter being located in said cavity.

15. The optical system of claim 12, wherein said cavity is evacuated.

16. The optical system of claim 12, further comprising:
at least a first spacing member arranged between said first substrate and said second substrate to facilitate formation of said cavity.

17. The optical system of claim 12, wherein a least one of said first substrate and said second substrate includes a recess, said recess being arranged to form at least a portion of said cavity.

18. The optical system of claim 12, wherein said electron emitter is a first electron emitter, and said electrical-to-optical converter is a first electrical-to-optical converter; and
wherein said integrated package further includes a second electron emitter and a second electrical-to-optical converter, said second electron emitter being operative to produce a second beam of electrons, said second electrical-to-optical converter being operative to receive the second beam of electrons and convert the second beam of electrons into light within said integrated package.

19. The optical system of claim 1, further comprising:
an optical transmission medium arranged to receive light produced by said electrical-to-optical converter.

20. A method for producing modulated light comprising:
producing a beam of electrons;
converting the beam of electrons into light; and
modulating the light.

21. The method of claim 20, further comprising:
providing an integrated package; and
wherein modulating the light comprises:
modulating the light such that a modulated light beam is emitted from the integrated package.

22. The method of claim 21, wherein the integrated package includes an electron emitter; and
wherein producing a beam of electrons comprises:
producing the beam of electrons with the electron emitter.

23. The method of claim 20, further comprising:
focusing the light to form a light beam.

24. The method of claim 23, wherein the light beam is focused after being modulated.

25. The method of claim 20, wherein the light is externally modulated.

* * * * *